United States Patent
Lim et al.

(10) Patent No.: US 6,819,708 B1
(45) Date of Patent: Nov. 16, 2004

(54) OCQPSK MODULATOR AND MODULATING METHOD USING 1-BIT INPUT FIR FILTER

(75) Inventors: In Gi Lim, Taejon (KR); Suk Ho Lee, Taejon (KR); Kyung Soo Kim, Taejon (KR); Han Jin Cho, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 742 days.

(21) Appl. No.: 09/716,185

(22) Filed: Nov. 17, 2000

(30) Foreign Application Priority Data

Nov. 19, 1999 (KR) ........................................ 1999-51589

(51) Int. Cl.[7] .............................................. H04B 1/69
(52) U.S. Cl. ........................ 375/146; 375/135; 375/308
(58) Field of Search .............................. 370/209, 342, 370/335, 337; 375/130, 150, 341, 145, 295, 146, 279, 141, 331, 326, 329, 308, 346, 135, 144, 142; 708/319, 625

(56) References Cited

U.S. PATENT DOCUMENTS

| | | | |
|---|---|---|---|
| 4,791,597 A | 12/1988 | Miron et al. ............ | 364/724.03 |
| 5,715,236 A * | 2/1998 | Gilhousen et al. ........... | 370/209 |
| 6,308,190 B1 * | 10/2001 | Willson et al. .............. | 708/319 |
| 6,311,203 B1 * | 10/2001 | Wada et al. ................. | 708/625 |
| 6,314,147 B1 * | 11/2001 | Liang et al. ................. | 375/346 |

* cited by examiner

Primary Examiner—Stephen Chin
Assistant Examiner—Ted Wang
(74) Attorney, Agent, or Firm—Seed IP Law Group PLLC

(57) ABSTRACT

A modulator for an IMT-2000 synchronous mobile station in a digital telecommunication and modulating method thereof, and more particularly, an OCQPSK modulator using FIR filters, each for performing 1:4 interpolation operations for 4 input data and a modulating method thereof. The orthogonal complex quadrature phase shift keying OCQPSK modulating apparatus uses a 1-bit input FIR filter that includes pseudo noise spreading for bifurcating 1-bit data inputted from input channels and pseudo-spreading the bifurcated 1-bit data, an FIR filter for receiving the 1-bit data and performing a filtering operation for pulse shaping, a gain multiplying block for multiplying filtered data outputted from the FIR filter by a gain for respective channels, and a channel adder block for adding data outputted from the gain multiplying block to output I channel and Q channel signals.

3 Claims, 4 Drawing Sheets

OCQPSK MODULATOR AND MODULATING METHOD USING 1-BIT INPUT FIR FILTER

TECHNICAL FIELD

The invention relates to a modulator for IMT-2000 synchronous mobile station in a digital telecommunication and modulating method thereof, and more particularly, the OCQPSK modulator using FIR filters, each for performing 1:4 interpolation operations for 4 input data and modulating method thereof.

BACKGROUND OF THE INVENTION

In a modulator for use in a digital telecommunication, modulating schemes such as Orthogonal Complex Quadrature Phase Shift Keying (OCQPSK) etc., have been widely used. At this time, in order to suppress inter-symbol interference, a pulse-shaping interpolation filtering is required. In case of a synchronous mobile station for the third generation telecommunication system IMT-2000, as the 1-bit output of 4 channels are multiplied by the gain, two each channels each are added and then modulated by OCQPSK modulating scheme in a single chip, additional two FIR filters having n-bit inputs are required.

FIG. 1 is a diagram for illustrating a construction of a conventional OCQPSK modulating apparatus which consists of an OCQPSK modulating block and a FIR filter block in an IMT-2000 synchronous mobile station. The 1-bit inputs of the four channels, as follows, CH1, CH2, CH3 and CH4 are inputted to a Walsh covering block 100, in which the three channels CH2, CH3 and CH4 in the Walsh covering block 100 are Walsh-Covered by Walsh quadrature codes $Walsh_2$, $Walsh_3$ and $Walsh_4$ for discriminating their channels. Then, they are inputted to a gain stage block 110 wherein multipliers 111, 112, 113 and 114 multiplies the input signals of respective channels to the gains $G_1$, $G_2$, $G_3$ and $G_4$ of respective channels to output n-bits, for adjusting the gain of respective channels. At this time, the n-bit outputs are added in adders 121 and 122 in a channel adder block 120 by every two channels, thus producing two quadrature signals DI and DQ.

Two quadrature signals DI and DQ are modulated in a OCQPSK modulating block 130. The modulating block 130 is composed of a PN spreader 131 for receiving PN sequences generated from long and short PN generator 140, a complex adder 132 for complex-multiplying the PN spreaded results based on OCQPSK modulating scheme. The outputs of the OCQPSK modulating block 130 are output in n-bit shape, in which the n-bit outputs are then inputted to two n-bit input FIR filters 141 and 142 in the FIR filter block 140 which then performs a FIR filtering and a pulse shaping for the entered outputs.

The output signals from the two FIR filters 141 and 142 are inputted to D/A converters 150 and 151 of an analog chip, this signals are converted the input signals into analog signal, modulated (152, 153) and multiplied by gains (154) for output.

At this time, if the gains are multiplied at the gain stage block 110, as respective channel data become a n-bit shape, the operations of the channel adder block 120, the OCQPSK modulating block 130 consisted of the PN spreader 131 and the complex adder 132, and the FIR filter block 140 are performed to produce a n-bit shape. Therefore, in implementing them, there is a problem that requires large size of hardware. Particularly, as the two n-bit input FIR filters must be implemented using multipliers, the amount of hardware use becomes further great.

These n-bit input FIR filter includes a Transversal FIR filter.

FIG. 2 shows a construction of a conventional 48 tap 1:4 interpolation Transversal FIR filter. This conventional filter is basic one and the operational scheme of which is hardware-implemented by the conventional FIR filter type.

For example, using this Transversal FIR filter design scheme, in order to design a pulse shaping FIR filter for performing 48 tap 1:4 interpolation having the input signals and the output signals of 8 bits and coefficient of 10 bits, twelve 10×8 multipliers, twelve 18-bit adders, forty four 18-bit registers and one 8-bit register are required.

As this Transversal FIR filter has a single structure, there is the problem that only one filter operation must be performed at a single filter without increasing its operational speed and then this requires large size of hardware as above-mentioned.

That is, the circuit size of the Transversal FIR filter is large compared to that of the FIR filter having 1-bit input. Thus, if the modulator is designed by using this conventional filter design scheme, the design area becomes greater and the frequency of the operating clock is unnecessarily increased.

SUMMARY OF THE INVENTION

The present invention is contrived to solve the conventional problems and the object of the present invention to provide a OCQPSK modulating apparatus capable of significantly reducing the hardware size, by using a 1-bit input FIR filter for input channels located in front of a gain stage block instead of using a n-bit input FIR filter the size of which is large.

In order to accomplish the above object, a quadrature phase shift keying (QPSK) modulating apparatus using a 1-bit input FIR filter according to the present invention is characterized in that it comprises pseudo noise spreading means for bifurcating 1-bit data inputted from input channels and pseudo-spreading said bifurcated 1-bit data, FIR filtering means for receiving said 1-bit data and performing a filtering operation for pulse shaping, a gain multiplying block for multiplying filtered data outputted from said FIR filtering means by gain for respective channels, and a channel adder block for adding data outputted from said gain multiplying block to output I channel and Q channel signals.

Preferably, the number of said input channels is 4×i, where i is a positive integer.

More preferably, the FIR filtering means includes 2×i FIR filters, where i is a positive integer, each for performing 1:4 interpolation operation for 4input data from said pseudo noise spreading means.

Also, according to the present invention, a quadrature phase shift keying (QPSK) modulating method using a 1-bit input FIR filter is provided. The method includes the following steps. A first step is of bifurcating 1-bit data inputted from input channels. A second step is of pseudo-spreading said bifurcated 1-bit data. A third step is of FIR filtering said 1-bit data for pulse shaping. A fourth step is of multiplying filtered data by gain for respective channels. And, a fifth step is of channel-adding said data multiplied by gain to output I channel and Q channel signals.

BRIEF DESCRIPTION OF THE DRAWINGS

The aforementioned aspects and other features of the present invention will be explained in the following description, taken in relation to the accompanying drawings, wherein.

DETAILED DESCRIPTION OF THE INVENTION

Figure 1:
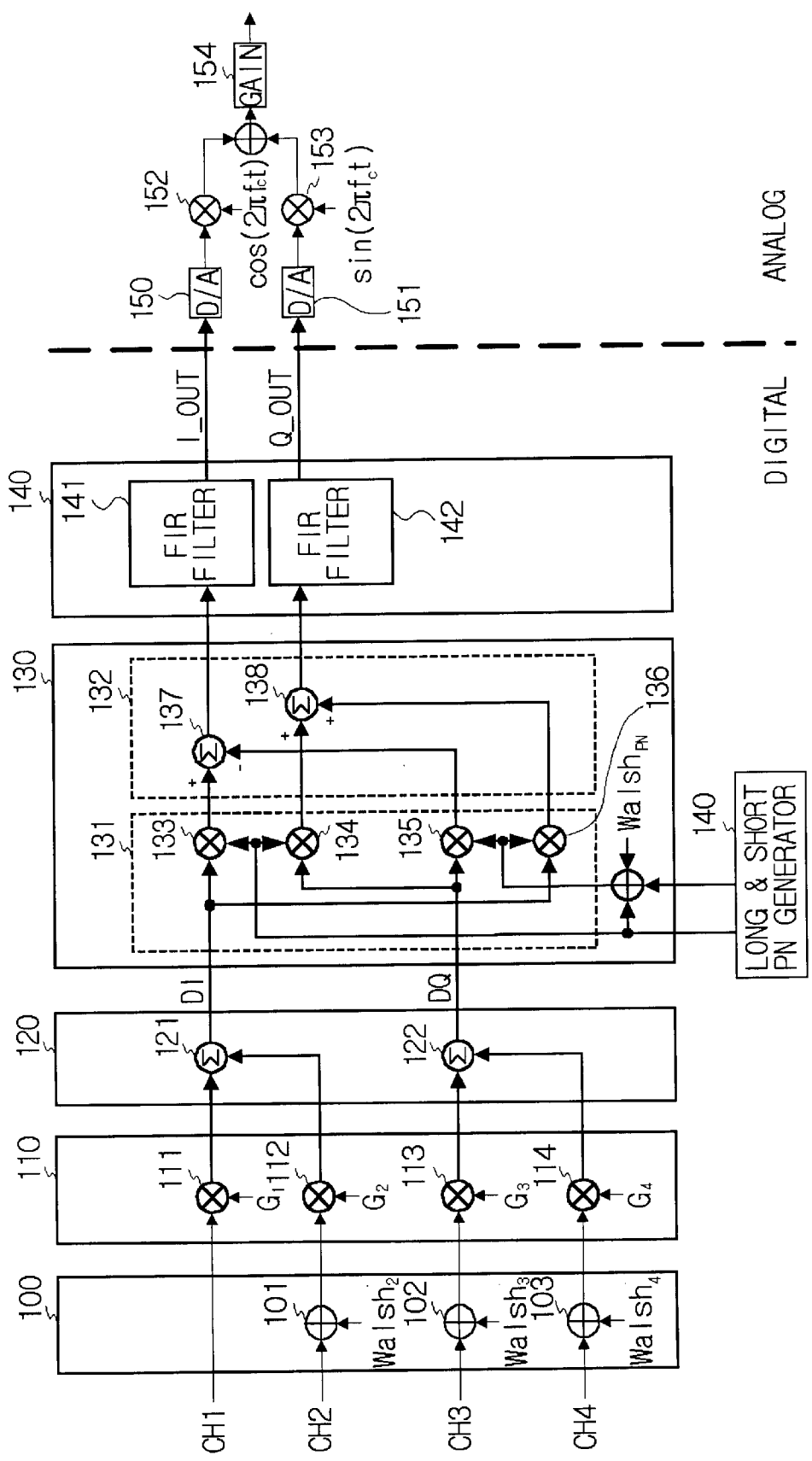
FIG. 1 is a diagram for illustrating a construction of a conventional OCQPSK modulating apparatus.
Figure 2:
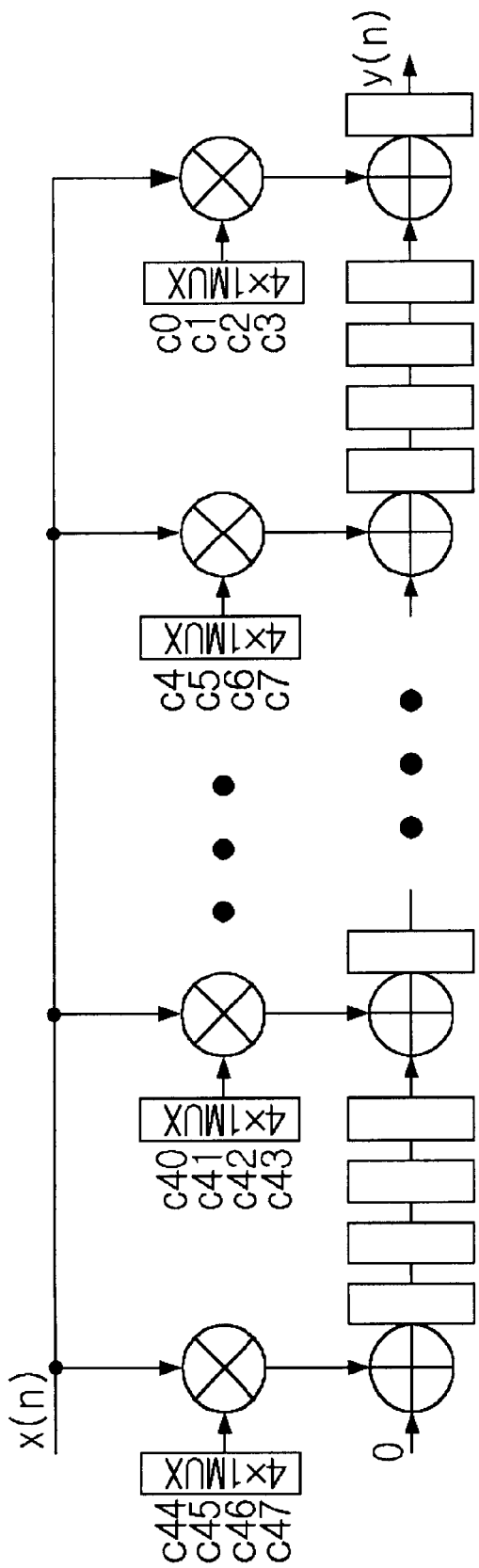
FIG. 2 is a diagram for illustrating a construction of a conventional Transversal FIR filter.

A QPSK modulating apparatus using a 1-bit input FIR filter and modulating method of the same according to a preferred embodiment of the present invention will be described in detail with reference to accompanying drawings, in which like reference numerals are used to identify the same or similar parts.

According to the present invention, an orthogonal complex quadrature phase shift keying OCQPSK modulating apparatus using a 1-bit input FIR filter is provided. The apparatus includes pseudo noise spreading means for bifurcating 1-bit data inputted from input channels and pseudo-spreading said bifurcated 1-bit data, FIR filtering means for receiving said 1-bit data and performing a filtering operation for pulse shaping, a gain multiplying block for multiplying filtered data outputted from said FIR filtering means by gain for respective channels, and a channel adder block for adding data outputted from said gain multiplying block to output I channel and Q channel signals.

Here, the number of said input channels is 4×i, where i is a positive integer. And, the FIR filtering means includes 2×i FIR filters, where i is a positive integer, each for performing 1:4 interpolation operation for 4 input data from said pseudo noise spreading means.

Figure 3:
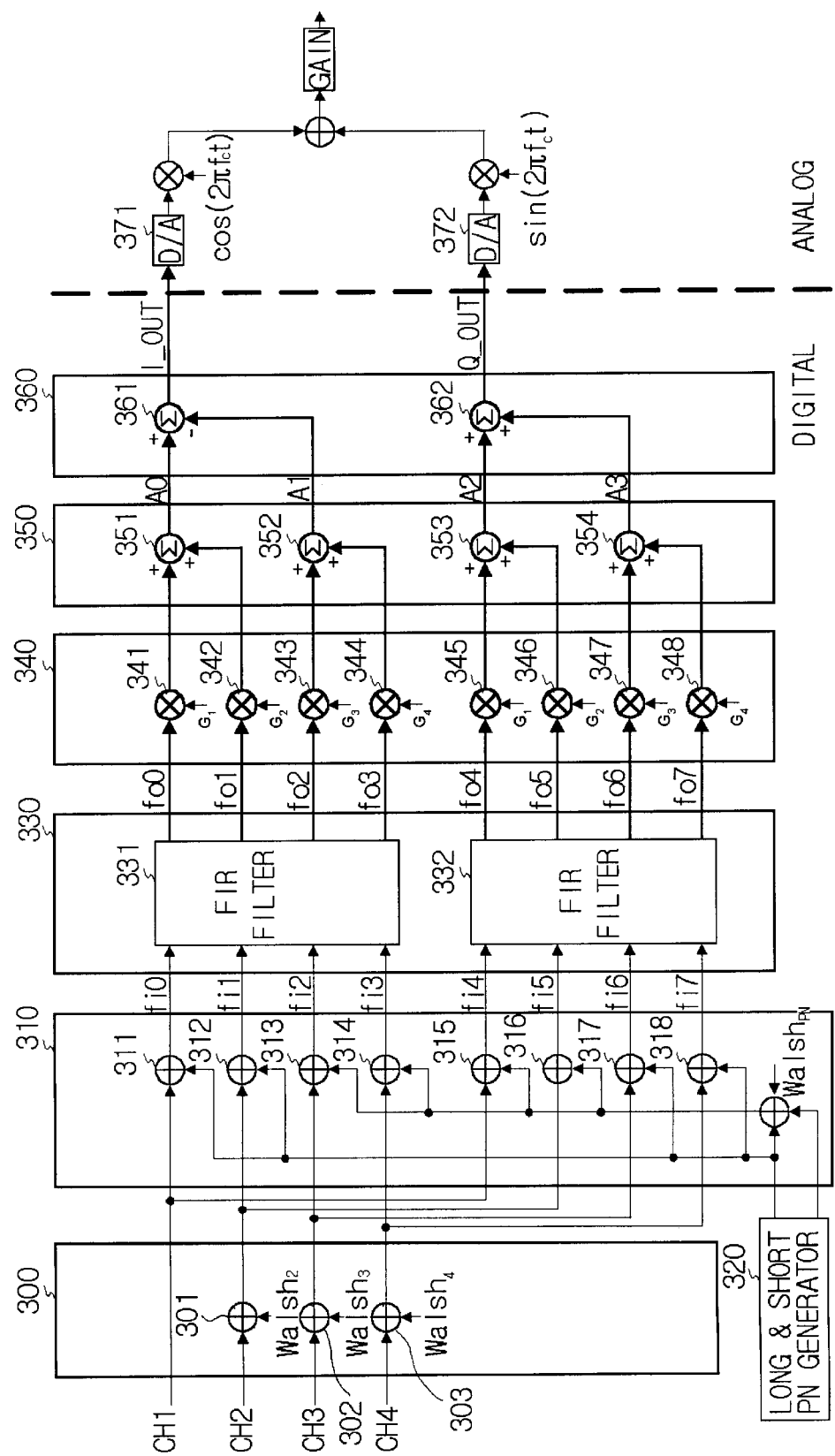
FIG. 3 is a diagram for illustrating a construction of a OCQPSK modulating apparatus using a 1-bit input FIR filter for 4 channels according to a preferred embodiment of the present invention.

FIG. 3 is a diagram for illustrating for a construction of OCQPSK modulating apparatus using a 1-bit input FIR filter for 4 channels according to a preferred embodiment of the present invention.

Now referring to FIG. 3, the 1-bit input data input from the four channels CH1, CH2, CH3 and CH4 are Walsh-Covered by the $Walsh_2$, $Walsh_3$ and $Wlash_4$ in the XOR gates 301, 302 and 303 of a Walsh covering block 300, respectively, for discriminating their channels and the resulting outputs are then generated as eight (8) 1 bit data each of which is divided into I and Qs. These eight 1 bit data are PN-spread by eight (8) XOR gates 311–318 of PN spreader 310 along with the outputs of the long & short PN generator 320, thus producing inputs fi0, fi1, fi2, fi3, fi4, fi5, fi6 and fi7 being inputs to the n-bit FIR filter 330.

Of them, the inputs fi0, fi1, fi2 and fi3 are inputted to a FIR filter 331 for performing four 1-bit input 1:4 interpolation in a single structure, and the inputs fi4, fi5, fi6 and fi7 are inputted to a FIR filter 332, so that the two FIR filters 331 and 332 produce filter outputs fo0, fo1, fo2, fo3, fo4, fo5, fo6 and fo7, which are in n-bit shape.

The outputs fo0, fo1, fo2, fo3, fo4, fo5, fo6 and fo7 generated from the two FIR filters 331 and 332 are each multiplied by gains $G_1$, $G_2$, $G_3$ and $G_4$ allocated to respective channels in the gain stage block 340 consisted of eight multipliers 341, 342, 343, 344, 345, 346, 347 and 348. Then, the outputs of the gain stage block 340 are each added every two channels by four channel adders 351, 352, 353 and 354 in the channel adder block 350. Next, the each four outputs of the channel adder block 350 are inputted to the two complex adders 361 and 362 in the complex adder block 360 for performing a complex multiplication based on OCQPSK modulation scheme. At this tine, the complex adder 361 performs an I_OUT=A0−A1 operation and the complex adder 362 performs a Q_OUT=A2+A3 operation.

The final outputs, I_OUT and Q_OUT of the OCQPSK modulating apparatus, which are output from the complex adder block 360, are converted into analog signals by the D/A converters 371 and 372 of an analog chip.

According to the present invention, it was found that, as a result of verification by simulation, the I_OUT and Q_OUT being the final outputs from the digital section meets a given rule and the hardware size where a QPSK modulating circuit to which the present invention is applied to designed, it is below ½ compared to the hardware size using the conventional n-bit input Transversal FIR filter shown in FIG. 1.

Figure 4:
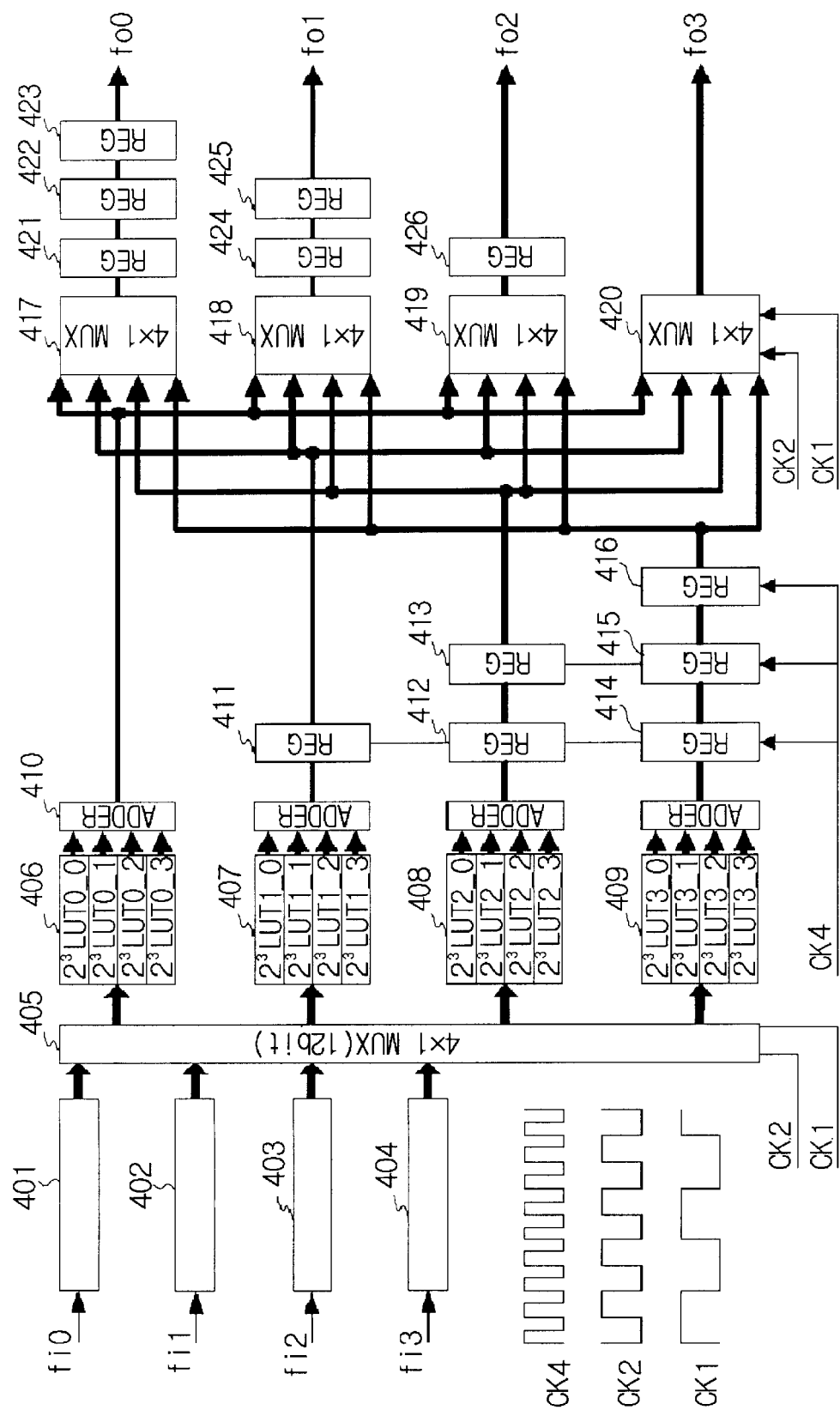
FIG. 4 is a diagram for illustrating a preferred embodiment of the 1-bit input FIR filters for 4 channels shown in FIG. 3.

FIG. 4 shows four 1-bit input 1:4 interpolation 48 tap FIR filters in a single filter structure applicable to the present invention. The FIR filter is a filter structure using a high-speed operation scheme that is advantageous in a pipeline scheme and a look-up table scheme, wherein the four 1-bit FIR filters are multiplexed into a single hardware and the pipeline scheme is used. Thus, it can reduce the hardware size and can perform a FIR filtering without increasing the operating frequency.

The four 1-bit filter inputs fi0, fi1, fi2 and fi3 inputted in a first clock period CK1 are stored into the four 12-bits serial to parallel shift registers 401, 402, 403 and 404. The 12 bits 4×1 MUX 405 selects the filter input terminal to sequentially perform depending on a CK4 clock by the selected clocks CK1 and CK2. That is, it selects one of the four 12-bit data.

The look-up table 406, 407, 408 and 409 divided into four for the filter operation for respective coefficient groups. That is, the LUT0 406 performs a filter operation for the coefficient group G0, the LUT1 407 performs filter operation for the coefficient group G1, the LUT2 408 performs filter operation for the coefficient group G2 and the LUT3 409 performs filter operation for the coefficient group G3. Therefore, for one input, the interpolation filter operations for the four groups can be performed.

The look-up tables 406, 407, 408 and 409 per respective groups are composed of four $2^3 \times 8$ bit memory and adders. In other words, the coefficient group G0 is experienced by a filter operation by means of the four look-up tables by dividing the twelve (12) bit input registers into four 3 bit registers LUT0_0, LUT0_1, LUT0_2, LUT0_3 through LUT3_0, LUT3_1, LUT3_2, LUT3_3. Then, the four output values are all added in the adder 410 to generate filter outputs per respective groups.

The filter output for the four coefficient groups simultaneously generated at the look-up table must be sequentially output in a series. Therefore, respective outputs must be delayed depending on corresponding coefficient groups. The output from the adder, being the filter output of the coefficient group G0 in FIG. 4, is output without delay. However, the register 411 delays by one clock the filter output of the coefficient group G1, the registers 412 and 413 delay by two clocks the filter output of the coefficient group G2 and the registers 414, 415 and 416 delay by three clocks the filter output of the coefficient group G3.

Though the outputs from the respective filters are distributed by the look-up table, they must be finally aligned on a filter basis. In FIG. 4, the 4×1 multiplexer 417 is a filter output aligner for the filter input fi0. Therefore, if the value of the clocks CK1 and CK2 is "00," the filter output of the coefficient group G0 is selected, if it is "01," the filter output of the coefficient group G1 is selected and if it is "11," the filter output of the coefficient group G3 is selected. In the same manner, the outputs of the filters for the filter inputs fi1, fi2 and fi3 are aligned by the 4×1 multiplexers 418, 419 and 420, respectively.

The each outputs from the output aligners of the four 4×1 multiplexers 417, 418 and 419 are delayed by one clock. That is, the filter output for the filter input fi0 is output ahead by 3 clocks over the filter output for the filter input fi3. Therefore, as the time alignment must make so that the four filter outputs can be output simultaneously, the pipeline registers for delay 421, 422, 423, 424, 425 and 426 may be used.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any other and all such applications, modifications, and embodiments within the scope of the present invention.

As can be understood from the above description, the present invention provides a modulating apparatus of a novel structure and method of the same in which the 1-bit outputs of the four channels within a single chip are filtered by the two FIR filters for simultaneously processing the four 1-bit input 1:4 interpolation FIR filter operations in a single filter structure, the filtered outputs are multiplied by the gains and then added based on the QPSK modulation, thus producing I channels and Q channels. Therefore, the present invention has the advantage that it can reduce the hardware size to ½ compared to when using the conventional n-bit input FIR filter.

The present invention has been described with reference to a particular embodiment in connection with a particular application. Those having ordinary skill in the art and access to the teachings of the present invention will recognize additional modifications and applications within the scope thereof. It is therefore intended by the appended claims to cover something and all such applications, modifications, and embodiments within the scope of the present invention.

What is claimed is:

1. An Orthogonal Complex Quadrature Phase Shift Keying (OCQPSK) modulating apparatus, comprising:

an OCQPSK modulating block and a FIR filtering block in a synchronous mobile station, said OCQPSK modulating block having a PN spreader block for performing PN spreading and a complex adder block for performing complex-multiplying based on OCQPSK modulating scheme;

a Walsh covering block for receiving 1-bit input data from four channels and Walsh-covering the input data and for outputting eight 1-bit data to the PN spreader block;

the FIR filtering block comprising two 1-bit input FIR filters, each FIR filter receiving four data among the spreaded results received from the PN spreader block and performing four 1-bit input 1:4 interpolation in a single structure and then producing four outputs in n-bit shape, respectively;

a gain multiplying block for multiplying the eight outputs received from each FIR filter by gain allocated to respective channels; and a channel adder block for adding the eight outputs received from the gain multiplying block by every two channels and producing four outputs to the complex adder block to enable the complex adder block to produce an I channel signal and a Q channel signal.

2. The Orthogonal Complex Quadrature Phase Shift Keying (OCQPSK) modulating apparatus of claim 1, wherein each 1-bit input FIR filter comprises:

1st to 4th registers for storing four 1-bit filter inputs in a first clock period;

an input multiplexer consisting of a 4×1 MUX for selecting one of four 12-bit data stored in the 1st to 4th registers depending on a first clock and a second clock;

1st to 4th look-up tables, each divided into four, for filter operation for each of 1st to 4th coefficient group of the input data selected from the input multiplexer, each look-up table consisting of a $2^3 \times 8$ bit memory and an adder;

a 1st pipeline register for delaying by a predetermined clock a filter output of each of the 2nd to 4th look-up table in order to output the filter output of the 1st to 4th coefficient group in a series;

an output multiplexer, which consists of four 4×1 MUX, for selecting one among the outputs of the 1st look-up table and the 1st pipeline register depending on the 1st clock and the 2nd clock;

a 2nd pipeline register for delaying by a predetermined clock a filter output of the 1st to 3rd MUX among the four MUX in the output multiplexer.

3. An Orthogonal Complex Quadrature Phase Shift Keying (OCQPSK) modulating method, the method comprising the steps of:

Walsh covering 1-bit input data received from four channels and producing eight 1-bit data;

PN spreading the eight 1-bit data;

FIR filtering the PN spreaded data by four data after receiving the spreaded data by 1-bite and performing four 1-bit input 1:4 interpolation in a single structure and then producing eight outputs in n-bit shape;

gain multiplying the eight outputs by a gain allocated to respective channels;

channel adding the eight output by every two channels and producing four outputs; and complex adding the four output by every two channel and producing I channel signal and Q channel signal.

* * * * *